(12) United States Patent
Mochizuki et al.

(10) Patent No.: US 6,793,718 B2
(45) Date of Patent: Sep. 21, 2004

(54) ADSORBENT FOR ADSORBING FUEL VAPORS

(75) Inventors: Yuji Mochizuki, Ogasa-gun (JP); Tokio Oi, Ogasa-gun (JP); Takashi Nishimoto, Toyota (JP); Shinsuke Kiyomiya, Seto (JP); Kouichi Oda, Kariya (JP)

(73) Assignees: Cataler Corporation, Ogasa-gun (JP); Toyota Jidosha Kabushiki Kaisha, Toyota (JP); Toyoda Boshoku Corporation, Kariya (JP)

( * ) Notice: Subject to any disclaimer, the term of this patent is extended or adjusted under 35 U.S.C. 154(b) by 13 days.

(21) Appl. No.: 10/406,262

(22) Filed: Apr. 4, 2003

(65) Prior Publication Data

US 2003/0196553 A1 Oct. 23, 2003

(30) Foreign Application Priority Data

Apr. 18, 2002 (JP) .................................... 2002-116702

(51) Int. Cl.⁷ .............................................. B01D 53/04
(52) U.S. Cl. ..................... 96/108; 55/385.3; 96/153; 502/416
(58) Field of Search ................ 95/143–147, 901, 95/108, 134, 135, 153, 154; 55/385.3; 502/416

(56) References Cited

U.S. PATENT DOCUMENTS

| 4,519,985 A | * | 5/1985 | Wells et al. ................. 423/6 |
| 4,906,263 A | * | 3/1990 | von Blucher et al. .......... 96/135 |
| 4,992,084 A | * | 2/1991 | Von Blucher et al. ......... 96/131 |
| 5,324,703 A | * | 6/1994 | McCue et al. ............... 502/424 |
| 5,710,092 A | * | 1/1998 | Baker ......................... 502/416 |
| 5,795,843 A | * | 8/1998 | Endo .......................... 502/416 |
| 5,880,061 A | * | 3/1999 | Yoshino et al. .............. 502/416 |
| 6,027,549 A | * | 2/2000 | Golden et al. ................. 95/98 |
| 6,294,501 B1 | * | 9/2001 | Chang ......................... 502/418 |
| 6,329,316 B1 | * | 12/2001 | Ogasa et al. ................ 502/416 |
| 6,346,140 B2 | * | 2/2002 | Miyazawa et al. ............ 95/139 |
| 6,540,815 B1 | * | 4/2003 | Hiltzik et al. ................ 95/146 |
| 2001/0019994 A1 | * | 9/2001 | Chang ......................... 502/416 |
| 2002/0025290 A1 | * | 2/2002 | Chang ......................... 423/418 |
| 2003/0101867 A1 | * | 6/2003 | MacDowall et al. .......... 95/143 |

FOREIGN PATENT DOCUMENTS

JP          61-55611 B2    11/1986

* cited by examiner

*Primary Examiner*—Robert H. Spitzer
(74) *Attorney, Agent, or Firm*—Oliff & Berridge, PLC

(57) ABSTRACT

An adsorbent for adsorbing fuel vapors is disclosed. The adsorbent is to be disposed in an inlet system of an internal combustion engine. It has pores, and 50% by volume or more of the pores have a pore diameter falling in a range of from 1.4 to 2.8 nm. It exhibits a unit pore volume of 0.3 mL or more with respect to 1 mL thereof. It is formed as a particle. It exhibits high performance on adsorbing fuel vapors, and shows high durability even when it is used for long period of time.

9 Claims, 2 Drawing Sheets

ADSORBENT FOR ADSORBING FUEL VAPORS

BACKGROUND OF THE INVENTION

1. Field of the Invention

The present invention relates to an adsorbent for adsorbing fuel vapors. The adsorbent adsorbs fuel vapors which leak from inlet systems of internal combustion engines, and emits them when inlet air is suctioned.

2. Description of the Related Art

Air polluting sources exhausted from internal combustion engines, such as gasoline engines and diesel engines, can be roughly divided into exhaust gases and fuel vapors.

The fuel vapors dissipate to air through inlet systems when internal combustion engines are stopped. As means for inhibiting the fuel vapors from dissipating, the following method is available. For example, a member for storing the fuel vapors is disposed in an inlet system of an internal combustion engine. The storage member temporarily adsorbs the fuel vapors which generate when the internal combustion engine is stopped. The storage member emits the fuel vapors to the inlet ports of the internal combustion engine when the internal combustion engine is driven. Thus, the fuel vapors are burned to purify. In this instance, the storage member is made generally by fixing an adsorbent on filters.

When internal combustion engines are stopped, the fuel vapors are filtered and adsorbed by adsorbents used as the member for storing the fuel vapors. When the internal combustion engines are driven, the adsorbed fuel vapors are eliminated from the adsorbents to the inlet ports of the combustion engines by inlet air. Thus, the adsorbents themselves are regenerated, and are used repeatedly.

As an adsorbent disposed in the inlet systems of the internal combustion engines, particulate activated carbon and fibrous activated carbon have been used in general. Recently, the pore diameter distribution of fibrous activated carbon has been controlled in order to devise techniques for reliably eliminating adsorbates from adsorbents and inhibiting the adsorption performance of adsorbents from degrading. For example, Japanese Examined Patent Publication (KOKOKU) No. 61-55,611 discloses such a fibrous activated carbon. In the fibrous activated carbon, the pore volume of the pores whose pore diameter is 120 Å (12 nm) or less is 0.61 cm$^3$/g, the volume of the pores whose pore diameter is 120 Å (12 nm) or less and falls in a range of from 30 to 120 Å (from 3 to 12 nm) falls in a range of from 0.155 to 0.5 cm$^3$/g, and the summed volume of the pores whose pore diameter falls in a range of from 30 to 120 Å (from 3 to 12 nm) occupies 17% by volume or more of the summed volume of the pores whose pore diameter is 120 Å (12 nm) or less.

However, when the fibrous activated carbon is used as the adsorbent, the adsorption performance might degrade as it is used for a long period of time under certain circumstances. Moreover, when the fibrous activated carbon is fixed on filters to use, the following problems might arise. In addition, the fibrous activated carbon might come off from the filters. The filters might exert increased resistance to the air flows in the inlet systems of internal combustion engines.

SUMMARY OF THE INVENTION

The present invention has been developed in view of the aforementioned circumstances. It is therefore an object of the present invention to provide an adsorbent for adsorbing fuel vapors, adsorbent which is less likely to degrade even when it is used for a long period of time. It is a further object of the present invention to provide an adsorbent for adsorbing fuel vapors, adsorbent which can be used reliably even when it is fixed on filters.

An adsorbent for adsorbing fuel vapors according to the present invention can achieve the aforementioned objects. The present adsorbent is for adsorbing fuel vapors, is to be disposed in an inlet system of an internal combustion engine, has pores, 50% by volume or more of the pores having a pore diameter falling in a range of from 1.4 to 2.8 nm, exhibits a unit pore volume of 0.3 mL or more with respect to 1 mL thereof, and is formed as a particle.

Since the present adsorbent has the pore diameter distribution and the unit pore volume, it exhibits high performance on adsorbing fuel vapors. Moreover, it shows high durability even when it is used for long period of time.

The present adsorbent can preferably comprise a porous carbonaceous material. Further, the porous carbonaceous material can preferably be activated carbon. Furthermore, in the present adsorbent, the particle can preferably comprise cylinder-shaped constituent particles whose diameter falls in a range of from 1.5 to 5.0 mm, or sphere-shaped or pulverized constituent particles whose particle diameter falls in a range of from 1.5 to 5.0 mm. Moreover, the present adsorbent can preferably exhibit a specific surface area of 1,500 m$^2$/g or more.

In addition, the present adsorbent can preferably have a first mass enlarged by a factor of 50% or more when it is contacted with a first adsorbate, which includes air saturated with saturated benzene vapor, at a flow rate of 2.0 L/min. at standard temperature and pressure until the adsorbed mass of the adsorbent become constant, and has a second mass enlarged by a factor of 35% or more when it is contacted with a second adsorbate, in which air saturated with saturated benzene vapor is diluted by pure air with such a ratio that the volume of the air saturated with saturated benzene vapor with respect to the summed volume of the air saturated with saturated benzene vapor and the pure air is 1/10 by volume, at a flow rate of 2.0 L/min. at standard temperature and pressure until the adsorbed mass of the adsorbent become constant.

As having described so far, the present adsorbent is improved in terms of the performance on adsorbing fuel vapors as well as the durability. Accordingly, it is possible to suitably use the present adsorbent for adsorbing fuel vapors. Moreover, it is possible to form the present adsorbent into shapes which exert less resistance to air flows in inlet systems of internal combustion engines. Consequently, it is possible to reliably use the present adsorbent even when it is fixed on filters.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
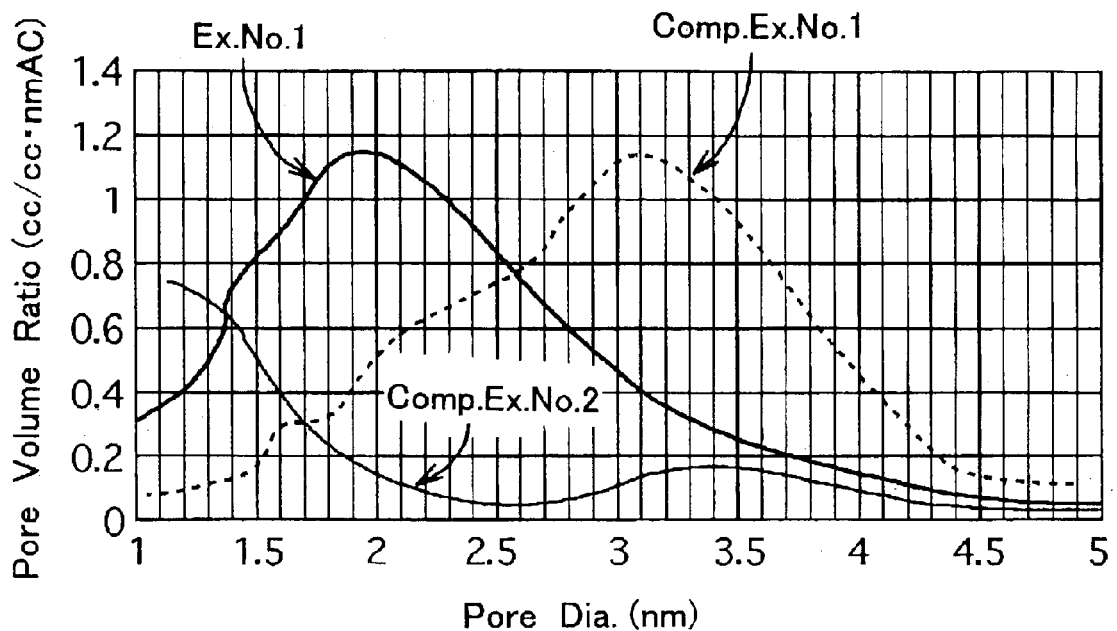
FIG. 1 is a graph for illustrating the pore diameter distributions which were exhibited by an adsorbent of Example No. 1 according to the present invention and adsorbents of Comparative Example Nos. 1 and 2.

Having generally described the present invention, a further understanding can be obtained by reference to the specific preferred embodiments which are provided herein for the purpose of illustration only and not intended to limit the scope of the appended claims.

The present adsorbent is for adsorbing fuel vapors. It is to be disposed in an inlet system of an internal combustion engine. It has pores, and 50% by volume or more of the pores have a pore diameter falling in a range of from 1.4 to 2.8 nm. It exhibits a unit pore volume of 0.3 mL or more with respect to 1 mL thereof. It is formed as a particle.

As materials for making the present adsorbent, it is possible to use any materials as far as they exhibit the aforementioned pore diameter distribution and unit pore volume, and which can emit adsorbed fuel vapors. For example, it is preferable to use activated carbon which is made from known raw materials such as woods and palm husks. Moreover, it is preferable to use porous carbonaceous materials such as graphite. In addition, in order to provide the present adsorbent with the pore diameter distribution and unit pore volume, it is preferable to use activated carbon whose raw material is coal particles.

When activated carbon is used to make the present adsorbent, it is possible to produce the present adsorbent by known carbonization temperatures and activation treatments, depending on using raw materials. Activated carbon is usually carbonized at a temperature of from 500 to 900° C., and is activated in an active gas atmosphere including water vapor, carbonic acid gas, or oxygen. For example, when carbon particles are used as the raw material, it is preferable to carbonize them at around 700° C., and thereafter to activate them at around 900° C. in a water vapor atmosphere. Note that the time for activation is controlled so that the resulting activate carbon exhibits the aforementioned pore diameter distribution in accordance with the needs.

It is possible to examine the pore diameter distribution of adsorbents by the nitrogen adsorption method. Note that the pore diameter distribution examined by the method is a pore diameter distribution of open pores in adsorbents. The open pores herein designate pores which communicate with the outside of adsorbents.

When adsorbents are used which have pores having a pore diameter of less than 1.4 nm in a volume of more than 50% by volume, adsorbed fuel vapors cannot be eliminated by air purging so that they accumulate in the pores. Accordingly, the durable adsorption performance of the adsorbents lowers. On the other hand, when adsorbents are used which have pores having a pore diameter of more than 2.8 nm in a volume of more than 50% by volume, low-concentration and low-boiling point fuel vapors cannot be adsorbed so that they pass through the adsorbents. Consequently, the adsorption performance of the adsorbents lowers.

The present adsorbent is formed as a particle. Accordingly, it is possible to suitably use the present adsorbent even when it is fixed on filters.

In the present adsorbent, the particle can preferably comprise cylinder-shaped constituent particles whose diameter falls in a range of from 1.0 to 5.0 mm. Further, the cylinder-shaped constituent particles can preferably have a length falling in a range of from 8 to 12 mm. Furthermore, the particle can preferably comprise sphere-shaped constituent particles whose particle diameter falls in a range of from 1.0 to 5.0 mm. Moreover, the particle can preferably comprise pulverized constituent particles whose particle diameter falls in a range of from 1.0 to 5.0 mm.

When adsorbents comprise cylinder-shaped constituent particles whose diameter is greater than 5.0 mm, or sphere-shaped or pulverized constituent particles whose particle diameter is greater than 5.0 mm, it is difficult to air purge such adsorbents in eliminating adsorbed fuel vapors from the adsorbents by inlet air. Accordingly, the adsorbed fuel vapors are less likely to be eliminated from the adsorbents. On the other hand, when adsorbents comprise cylinder-shaped constituent particles whose diameter is smaller than 1.0 mm, or sphere-shaped or pulverized constituent particles whose particle diameter is smaller than 1.0 mm, the durable adsorption performance of the adsorbents is lowered. It seems that the cylinder-shaped, sphere-shaped or pulverized constituent particles with the smaller diameters or particle diameters are likely to be packed so closely that the porosity is reduced between the constituent particles. Accordingly, the durable adsorption performance of the resulting adsorbents comprising the smaller-diameter cylinder-shaped constituent particles or the smaller-particle diameter sphere-shaped or pulverized constituent particles has been reduced as a whole. Moreover, the cylinder-shaped, sphere-shaped or pulverized constituent particles with the smaller diameters or particle diameters exert a high flow resistance when they are processed into filters, because the porosity is reduced between the constituent particles. In addition, the adsorbents comprising the smaller-diameter cylinder-shaped constituent particles or the smaller-particle diameter sphere-shaped or pulverized constituent particles are likely to be covered more with binders which fix them on filters. Consequently, the durable adsorption performance of the adsorbents seems to be degraded.

The present adsorbent can preferably exhibit a specific surface area of 1,500 m$^2$/g or more. It is possible to measure the specific surface area of adsorbents by the BET method. When the specific surface area of adsorbents is less than 1,500 m$^2$/g, the contacting area between the adsorbents and fuel vapors is reduced so that the adsorption performance of the adsorbents is lowered with respect one passing of inlet air.

The present adsorbent can preferably have a first mass enlarged by a factor of 50% or more when it is contacted with a first adsorbate, which includes air saturated with saturated benzene vapor, at a flow rate of 2.0 L/min. at standard temperature (i.e., room temperature) and pressure (i.e., atmospheric pressure) until the adsorbed mass of the adsorbent become constant. Moreover, it can preferably have a second mass enlarged by a factor of 35% or more when it is contacted with a second adsorbate, in which air saturated with saturated benzene vapor is diluted by pure air with such a ratio that the volume of the air saturated with saturated benzene vapor with respect to the summed volume of the air saturated with saturated benzene vapor and the pure air is 1/10 by volume, at a flow rate of 2.0 L/min. at standard temperature and pressure until the adsorbed mass of the adsorbent become constant. The first mass exhibited by adsorbents when they are contacted with the first adsorbate in the aforementioned manner will be hereinafter referred to as a 1/1 benzene equilibrium adsorption. The second mass exhibited by adsorbents when they are contacted with the second adsorbate in the aforementioned manner will be hereinafter referred to as a 1/10 benzene equilibrium adsorption.

When the present adsorbent satisfies the benzene equilibrium adsorption requirements, not only it shows a high adsorption capability to low-concentration fuel vapors because it exhibits the high 1/10 benzene equilibrium adsorption, but also it shows a high elimination capability to fuel vapors because it exhibits the high 1/1 benzene equilibrium adsorption. Accordingly, the present adsorbent can further preferably adsorb and emit fuel vapors.

It is possible to measure the benzene equilibrium adsorption by the solvent vapor adsorption performance testing method set forth in paragraph 5.1.2 of the activated carbon testing methods prescribed in Japanese Industrial Standard (JIS) K 1474. In the present specification, the adsorbate means benzene vapor adsorbed onto adsorbents. Specifically, the first adsorbate designates a mixture vapor in which air is saturated with saturated benzene vapor. The second adsorbate designates another mixture vapor in which air saturated with saturated benzene vapor is diluted by pure air with such a ratio that the volume of the air saturated with saturated benzene vapor with respect to the summed volume of the air saturated with saturated benzene vapor and the pure air is 1/10 by volume. Moreover, the 1/1 and 1/10 benzene equilibrium adsorptions mean the masses of adsorbed benzene when the mass of adsorbents with adsorbed benzene becomes constant after flowing the mixture vapors through them at a predetermined flow rate for a predetermined period of time at standard temperature and pressure. Thus, the benzene equilibrium adsorption means the enlarged masses of adsorbents when the mixture vapors flowing into the adsorbents and the mixture vapors flowing out of them are in equilibrium. For example, the 50% by mass benzene equilibrium adsorption designates that the mass of adsorbents is enlarged by a factor of 50% by mass when compared with their mass before the mixture vapors are flowed into them.

EXAMPLES

Hereinafter, the present invention will be described in detail with reference to specific examples.

Example No. 1

A raw material mixture was prepared in which a graphite particle, pitch and coal tar were mixed with a proportion of 5 parts by weight, 5 parts by weight and 25 parts by weight, respectively, with respect to 100 parts by weight of a coal particle. The raw material mixture was pitch formed as cylinder shapes whose diameter was 1.8 mm and length fell in a range of from 8 to 12 mm. Thus, a particulate activated carbon raw material was produced. The resulting particulate activated carbon raw material was carbonized at 700° C. for 30 minutes. Thereafter, 500 g of the carbonized particulate activated carbon raw material was activated at 950° C. for 6 hours in a water vapor atmosphere, thereby producing an adsorbent of Example No. 1. FIG. 1 illustrates a pore diameter distribution, which was exhibited by the adsorbent of Example No. 1, together with those exhibited by later-described adsorbents of Comparative Example Nos. 1 and 2.

Comparative Example No. 1

An adsorbent of Comparative Example No. 1 was produced in the same manner as the adsorbent of Example No. 1. However, as illustrated in FIG. 1, it exhibited a pore diameter distribution which differed from the pore diameter distribution exhibited by the adsorbent of Example No. 1.

Specifically, the same particulate activated carbon raw material as that of Example No. 1 was carbonized at 700° C. for 30 minutes. Thereafter, 500 g of the carbonized particulate activated carbon raw material was activated at 950° C. for 9 hours in a water vapor atmosphere, thereby producing an adsorbent of Comparative Example No. 1. As shown in FIG. 1, the adsorbent of Comparative Example No. 1 had pores, and approximately 40% by volume of the pores had a pore diameter of more than 2.8 nm.

Comparative Example No. 2

Except that a different raw material was used, an adsorbent of Comparative Example No. 2 was produced in the same manner as the adsorbent of Example No. 1. However, as illustrated in FIG. 1, it exhibited a pore diameter distribution which differed from the pore diameter distribution exhibited by the adsorbent of Example No. 1.

Specifically, a raw material mixture was prepared in which coal tar was mixed with a proportion of 30 parts by weight with respect to 100 parts by weight of a palm husk particle. The raw material mixture was pitch formed as cylinder shapes whose diameter was 1.8 mm and length fell in a range of from 8 to 12 mm. Thus, a particulate activated carbon raw material was produced. The resulting particulate activated carbon raw material was carbonized at 700° C. for 30 minutes. Thereafter, 500 g of the carbonized particulate activated carbon raw material was activated at 950° C. for 3 hours in a water vapor atmosphere, thereby producing an adsorbent of Comparative Example No. 2. As shown in FIG. 1, the adsorbent of Comparative Example No. 2 had pores, and approximately 40% by volume of the pores had a pore diameter of less than 1.4 nm.

Comparative Example No. 3

An adsorbent of Comparative Example No. 3 was produced in the same manner as the adsorbent of Example No. 1. Although the adsorbent of Comparative Example No. 3 had the same pore diameter distribution as exhibited by the adsorbent of Example No. 1, it was formed as cylinder shapes whose diameter differed from that of the cylinder shapes formed in Example No. 1.

Specifically, the same raw material mixture as that of Example No. 1 was pitch formed as cylinder shapes whose diameter was 9 mm and length fell in a range of from 8 to 12 mm. The resulting particulate activated carbon raw material was carbonized at 700° C. for 30 minutes. Thereafter, 500 g of the carbonized particulate activated carbon raw material was activated at 950° C. for 6 hours in a water vapor atmosphere, thereby producing an adsorbent of Comparative Example No. 3.

Comparative Example No. 4

An adsorbent of Comparative Example No. 4 was produced in the same manner as the adsorbent of Example No. 1. Although the adsorbent of Comparative Example No. 4 had the same pore diameter distribution as exhibited by the adsorbent of Example No. 1, it was formed as cylinder shapes whose diameter and length differed from those of the cylinder shapes formed in Example No. 1.

Specifically, the same raw material mixture as that of Example No. 1 was pitch formed as cylinder shapes whose diameter was 0.9 mm and length fell in a range of from 4 to 6 mm. The resulting particulate activated carbon raw material was carbonized at 700° C. for 30 minutes. Thereafter, 500 g of the carbonized particulate activated carbon raw material was activated at 950° C. for 6 hours in a water vapor atmosphere, thereby producing an adsorbent of Comparative Example No. 4.

Example No. 2

An adsorbent of Example No. 2 was produced by pulverizing the adsorbent of Example No. 1. The resultant adsorbent of Example No. 2 had particle diameters falling in a range of from 1 to 2 mm.

Tests And Assessments

The adsorbents of Example Nos. 1 and 2 as well as the adsorbents of Comparative Example Nos. 1 through 4 were subjected to the following tests.

Tests on Physical Properties

The adsorbent of Example No. 1 as well as the adsorbents of Comparative Example Nos. 1 and 2 were tested on the following three physical properties. Specifically, they were examined for the pore diameter distribution by the nitrogen gas adsorption method, for the specific surface area by the BET method, and for the benzene equilibrium adsorption by the solvent vapor adsorption performance testing method set forth in paragraph 5.1.2 of the activated carbon testing methods prescribed in Japanese Industrial Standard (JIS) K 1474.

Test on Initial Adsorption Performance

The adsorbents of Example Nos. 1 and 2 as well as the adsorbents of Comparative Example Nos. 1 through 4 were subjected to the following initial adsorption performance test. The used adsorbate was butane which included in gasoline vapors.

Figure 2:
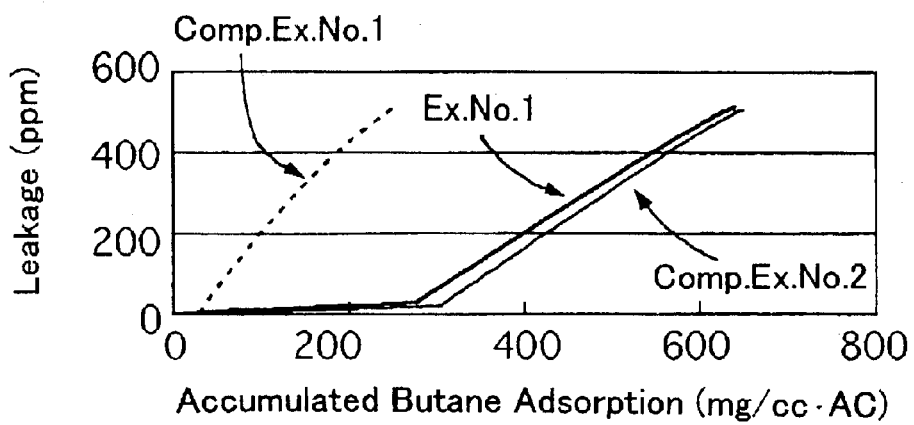
FIG. 2 is a graph for illustrating the variations of butane gas leakages which were shown by the adsorbent of Example No. 1 and the adsorbents of Comparative Example Nos. 1 and 2 in an initial adsorption performance test.

A cylinder-shaped column was prepared, and had an inside diameter of 94 mm and a length of 100 mm. A 14-mesh net was disposed at the middle of the column. The adsorbents of Example Nos. 1 and 2 as well as the adsorbents of Comparative Example Nos. 1 through 4 were disposed on the net in a volume of 70 mL, respectively. A gas bomb was connected with the upstream end of the column by way of a pipe, and a hydrocarbon meter was connected with the downstream end of the column. The bomb held a mixture gas which comprised 1% by volume butane gas and the balance of dry nitrogen at standard temperature and pressure. The hydrocarbon meter measured the butane gas flow by a flame ionization detector (or FID). From the upstream end of the columns with the thus filled adsorbents, the mixture gas was flowed at a rate of 0.1 L/min. to adsorb butane gas onto the adsorbents. The concentration of the butane gas in the mixture gas, which flowed out of the downstream end of the columns, was measured by the hydrocarbon meter. The time at which the butane gas concentration reached 500 ppm was considered the leakage break point. The accumulated butane gas flow, which flowed into the columns until the leakage break point, was regarded as the butane adsorption exhibited by the respective adsorbents. The adsorbents exhibiting the accumulated butane adsorption of 500 mg or more with respect to the unit volume of 1 mL, were assessed that the initial adsorption performance was good, and are marked with "Good" in Table 1 below. On the other hand, the adsorbent exhibiting the accumulated butane adsorption of less than 500 mg with respect to the unit volume of 1 mL, was assessed that the initial adsorption performance was poor, and is marked with "Poor" in Table 1. Table 1 sets forth the results of the initial adsorption performance test. FIG. 2 illustrates the variations of the butane gas leakage, variations which were exhibited by the adsorbent of Example No. 1 as well as the adsorbents of Comparative Example Nos. 1 and 2.

TABLE 1

| | | Ex. No. 1 | Comp. Ex. No. 1 | Comp. Ex. No. 2 | Comp. Ex. No. 3 | Comp. Ex. No. 4 | Ex. No. 2 |
|---|---|---|---|---|---|---|---|
| Physical Properties | Pore Dia. Distribution: Less than 1.4 nm | 20% by volume | 20% by volume | 40% by volume | 20% by volume | 20% by volume | 20% by volume |
| | Pore Dia. Distribution: From 1.4 nm to 2.8 nm | 60% by volume | 40% by volume | 40% by volume | 60% by volume | 60% by volume | 60% by volume |
| | Pore Dia. Distribution: More than 2.8 nm | 20% by volume | 40% by volume | 20% by volume | 20% by volume | 20% by volume | 20% by volume |
| | $\frac{1}{10}$ Benzene Equilibrium Adsorption | 40% by mass | 35% by mass | 32% by mass | Not Measured | Not Measured | Not Measured |

TABLE 1-continued

| | Ex. No. 1 | Comp. Ex. No. 1 | Comp. Ex. No. 2 | Comp. Ex. No. 3 | Comp. Ex. No. 4 | Ex. No. 2 |
|---|---|---|---|---|---|---|
| ¼ Benzene Equilibrium Adsorption | 64% by mass | 72% by mass | 45% by mass | Not Measured | Not Measured | Not Measured |
| Unit Pore Volume | 0.35 mL/mL | 0.37 mL/mL | 0.26 mL/mL | Not Measured | Not Measured | Not Measured |
| Specific Surface Area | 1,630 m²/g | 1,580 m²/g | 1,330 m²/g | Not Measured | Not Measured | Not Measured |
| Initial Adsorption Performance | Good | Poor | Good | Good | Good | Good |
| Durable Adsorption Performance | Good | Not Assessed | Poor | Poor | Poor | Good |
| Resistance to Air Flow | Good | Not Assessed | Not Assessed | Good | Poor | Poor |
| Dia. of Cylinder-shaped Constituent Particles | 1.8 mm | 1.8 mm | 1.8 mm | 9.0 mm | 0.9 mm | Pulverized |

Test on Durable Adsorption Performance

The adsorbents of Example Nos. 1 and 2 as well as the adsorbents of Comparative Example Nos. 1 through 4 were subjected to the following durable adsorption performance test.

Figure 3:
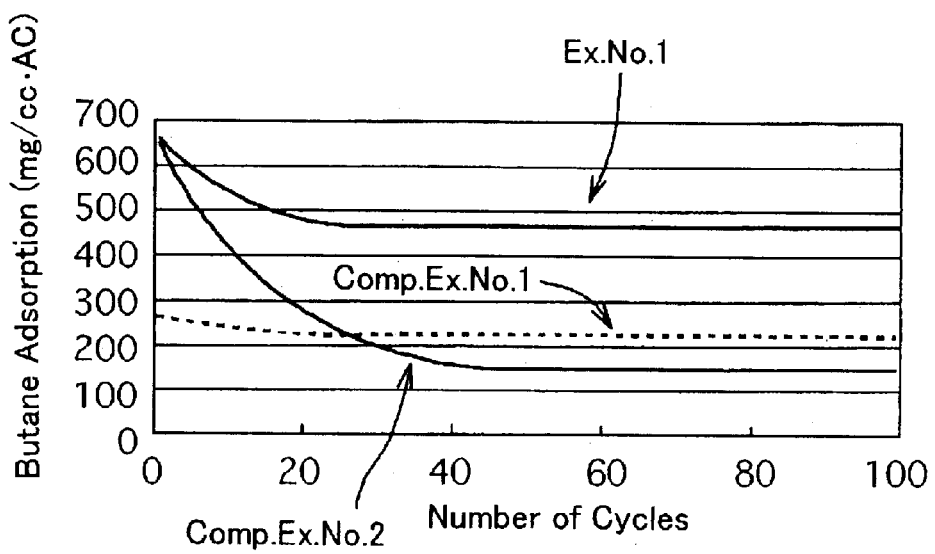
FIG. 3 is a graph for illustrating the variations of butane adsorptions which were shown by the adsorbent of Example No. 1 and the adsorbents of Comparative Example Nos. 1 and 2 in a durable adsorption performance test.
Figure 4:
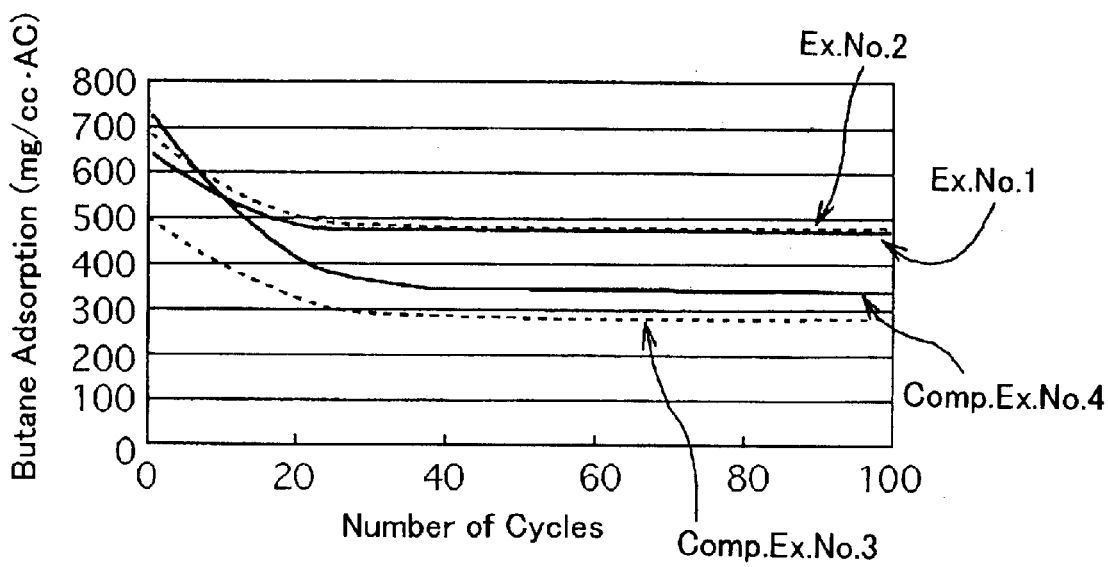
FIG. 4 is a graph for illustrating the variations of butane adsorptions which were shown by the adsorbent of Example No. 1, an adsorbent of Example No. 2 according to the present invention, and adsorbents of Comparative Example Nos. 3 and 4 in a durable adsorption performance test.

The butane was adsorbed onto the respective adsorbents in the same manner as the initial adsorption test. When the adsorbents showed the break point, dry air was flowed into them at a rate of 5 L/min. for 10 minutes to eliminate the adsorbed butane from them. Thereafter, the adsorption and elimination of the butane were repeated by the same procedure to examine the adsorbents for the variation of the butane adsorption until the adsorbents showed the butane gas-leakage break point. Specifically, the adsorption of the butane and the elimination were alternately carried out once for each operation, and the alternate adsorption and elimination operation was regarded as one cycle. The cycle was repeated 100 times. Thus, the adsorbents were subjected to a durable adsorption performance test in which the alternate adsorption and elimination operation was carried out 100 cycles. The adsorbents exhibiting the butane adsorption of 400 mg or more with respect to the unit volume of 1 mL, were assessed that the durable adsorption performance was good, and are marked with "Good" in Table 1. On the other hand, the adsorbents exhibiting the butane adsorption of less than 400 mg with respect to the unit volume of 1 mL, were assessed that the durable adsorption performance was poor, and are marked with "Poor" in Table 1. Table 1 summarizes the results of the durable adsorption performance test as well. FIG. 3 illustrates the variations of the butane adsorption which were exhibited by the adsorbent of Example No. 1 as well as the adsorbents of Comparative Example Nos. 1 and 2. FIG. 4 illustrates the variations of the butane adsorption which were exhibited by the adsorbents of Example Nos. 1 and 2 as well as the adsorbents of Comparative Example Nos. 3 and 4.

Test on Air Flow Resistance

The adsorbents of Example Nos. 1 and 2 as well as the adsorbents of Comparative Example Nos. 1 through 4 were processed into a filter, respectively. The resulting filters were examined for the air flow resistance. Specifically, each of the adsorbents was processed into a filter whose length was 160 mm and diameter was 285 mm in the following manner. First of all, a 16-mesh glass fiber net was prepared. An acrylic emulsion was applied to the glass fiber net, and was dried at 80° C. for 1 hour. After drying, the glass fiber net thus provided with an enhanced adhesive force was covered with each of the adsorbents in an amount of 650 g with respect to 1 m². The glass fiber net was further covered with a non-woven cloth, and was fixed to it at the outer periphery by heat welding. 6 filters were thus prepared. In cases where the filters exhibited an air flow resistance of 200 Pa or less when the aforementioned mixture gas comprising the butane gas and nitrogen gas was flowed through them at a flow rate of 9.3 m³/min., they were assessed that they exerted air flow resistance less, and the corresponding adsorbents are marked with "Good" in Table 1. Table 1 recites the results of the air flow resistance test.

As can be see from Table 1, the adsorbent of Example No. 1 was good in terms of the initial adsorption performance as well as the durable adsorption performance. In addition, when it was processed into the filter, it exerted the air flow resistance less satisfactorily.

On the other hand, as illustrated in FIG. 2, the adsorbent of Comparative Example No. 1 showed the sharply lowered initial adsorption performance. It is believed that the initial adsorption performance was degraded because the adsorbent of Comparative Example No. 1 had pores whose pore diameters were greater than those of the pores in the adsorbent of Example No. 1.

As illustrated in FIG. 2, the adsorbent of Comparative No. 2 exhibited the satisfactory initial adsorption performance equal to the initial adsorption performance exhibited by the adsorbent of Example No. 1. However, as illustrated in FIG. 3, the adsorbent of Comparative Example No. 2 showed the durable adsorption performance remarkably inferior to the durable adsorption performance shown by the adsorbent of Example No. 1. Note that the adsorbent of Comparative Example No. 2 had pores whose pore diameters were smaller than those of the pores in the adsorbent of Example No. 1. Accordingly, it is believed that the adsorbent of Comparative Example No. 2 showed the lowered durable adsorption performance, though it exhibited the satisfactory initial adsorption performance.

As illustrated in FIG. 4, the adsorbent of Comparative Example No. 3 exhibited the lowered durable adsorption performance compared with the durable adsorption performance exhibited by the adsorbent of Example No. 1. However, when the adsorbent of Comparative Example No. 3 was processed into the filter, the resulting filter exerted the air flow resistance satisfactorily less. Since the diameter of the constituent particles, making the adsorbent of Comparative Example No. 3, was greater comparatively, the adsorbed butane was eliminated from the adsorbent of Comparative Example No. 3 less satisfactorily than from the adsorbent of Example No. 1. On the contrarily, since the diameter was greater comparatively, the porosity was enhanced between the constituent particles of the adsorbent of Comparative Example No. 3. As a result, it is believed that the adsorbent of Comparative Example No. 3 exerted the air flow resistance less.

The adsorbent of Comparative Example No. 4 exhibited the initial adsorption performance equivalent to the initial adsorption performance exhibited by the adsorbent of Example No. 1. However, as illustrated in FIG. 4, the adsorbent of Comparative Example No. 4 showed the lowered durable adsorption performance. Since the diameter and length of the constituent particles, making the adsorbent of Comparative Example No. 4, were smaller, it seems that the adsorbent of Comparative Example No. 4 was likely to be packed closely so that the porosity between the constituent particles was reduced in the adsorbent of Comparative Example No. 4. Accordingly, the adsorbent of Comparative Example No. 4 had exhibited the reduced durable adsorption performance as a whole. Consequently, it is believed that the durable adsorption performance was likely to lower in the adsorbent of Comparative Example No. 4. Moreover, when the adsorbent of Comparative Example No. 4 was processed into the filter, the resulting filter exerted the air flow resistance higher comparatively. Since the diameter and length of the constituent particles, making the adsorbent of Comparative Example No. 4, were smaller, the porosity was reduced between the constituent particles of the adsorbent of Comparative Example No. 4. As a result, it is believed that the adsorbent of Comparative Example No. 4 exerted the air flow resistance more.

As illustrated in FIG. 4, the adsorbent of Example No. 2 showed the durable adsorption performance equivalent to the durable adsorption performance exhibited by the adsorbent of Example No. 1. However, when the adsorbent of Example No. 2 was processed into the filter, the resulting filter exerted the air flow resistance higher comparatively. Since the adsorbent of Example No. 2 was pulverized, some of the constituent particles had sharply reduced particle diameters. As a result, it is believed that the adsorbent of Example No. 2 exerted the air flow resistance more due to the same reason as the adsorbent of Comparative Example No. 4 exerted the air flow resistance more.

Having now fully described the present invention, it will be apparent to one of ordinary skill in the art that many changes and modifications can be made thereto without departing from the spirit or scope of the present invention as set forth herein including the appended claims.

What is claimed is:

1. An adsorbent for adsorbing fuel vapors, the adsorbent to be disposed in an inlet system of an internal combustion engine, having pores, 50% by volume or more of the pores having a pore diameter falling in a range of from 1.4 to 2.8 nm, exhibiting a unit pore volume of 0.3 mL or more with respect to 1 mL thereof, and being formed as a particulate.

2. The adsorbent set forth in claim 1 comprising a porous carbonaceous material.

3. The adsorbent set forth in claim 2, wherein the porous carbonaceous material is activated carbon.

4. The adsorbent set forth in claim 1, wherein the particle comprises cylinder-shaped constituent particles whose diameter falls in a range of from 1.0 to 5.0 mm.

5. The adsorbent set forth in claim 4, wherein the cylinder-shaped constituent particles have a length falling in a range of from 8 to 12 mm.

6. The adsorbent set forth in claim 1, wherein the particle comprises sphere-shaped constituent particles whose particle diameter falls in a range of from 1.0 to 5.0 mm.

7. The adsorbent set forth in claim 1, wherein the particle comprises pulverized constituent particles whose particle diameter falls in a range of from 1.0 to 5.0 mm.

8. The adsorbent set forth in claim 1 exhibiting a specific surface area of 1,500 $m^2/g$ or more.

9. The adsorbent set forth in claim 1 having a first mass enlarged by a factor of 50% or more when it is contacted with a first adsorbate, which includes air saturated with saturated benzene vapor, at a flow rate of 2.0 L/min. at standard temperature and pressure until the adsorbed mass of the adsorbent become constant, and having a second mass enlarged by a factor of 35% or more when it is contacted with a second adsorbate, in which air saturated with saturated benzene vapor is diluted by pure air with such a ratio that the volume of the air saturated with saturated benzene vapor with respect to the summed volume of the air saturated with saturated benzene vapor and the pure air is 1/10 by volume, at a flow rate of 2.0 L/min. at standard temperature and pressure until the adsorbed mass of the adsorbent become constant.

* * * * *